United States Patent
Kuck

Patent Number: 5,192,117
Date of Patent: Mar. 9, 1993

[54] HUBCAP WITH VENT

[76] Inventor: Gary L. Kuck, 692 W. Lakeshore, Lincoln, Nebr. 68525

[21] Appl. No.: 820,152

[22] Filed: Jan. 13, 1992

[51] Int. Cl.⁵ ............................................. B60B 7/00
[52] U.S. Cl. ............................ 301/108.1; 301/108.4; 55/323
[58] Field of Search ........... 301/108 R, 108 A, 108 S, 301/108 TW; 55/523, 524, 525, 526, 310, 385.3

[56] References Cited

U.S. PATENT DOCUMENTS

| | | | |
|---|---|---|---|
| 2,576,610 | 11/1951 | Kunzog | 55/523 X |
| 2,604,958 | 7/1952 | Leufvenius | 55/523 X |
| 2,655,041 | 10/1953 | Jacobsson | 55/523 X |
| 3,064,982 | 11/1962 | Stephens | 301/108 TW |
| 3,460,874 | 8/1969 | Johnson | 301/108 R |
| 3,649,080 | 3/1972 | Molinare | 301/108 R |

Primary Examiner—Russell D. Stormer
Attorney, Agent, or Firm—Zarley, McKee, Thomte, Voorhees & Sease

[57] ABSTRACT

A hubcap for a wheel is disclosed and is comprised of a generally cup-shaped member adapted to be secured to a wheel to prevent contaminants from entering the wheel bearing. The hubcap has a vent opening formed therein which has a cylindrical plug inserted thereinto and which is comprised of a bronze powder material. The cylindrical plug is impervious to water and other contaminants so that the water and other contaminants may not enter the interior of the hub cap. The cylindrical plug does permit the passage of air therethrough so that excessive pressure within the hubcap may be vented.

2 Claims, 2 Drawing Sheets

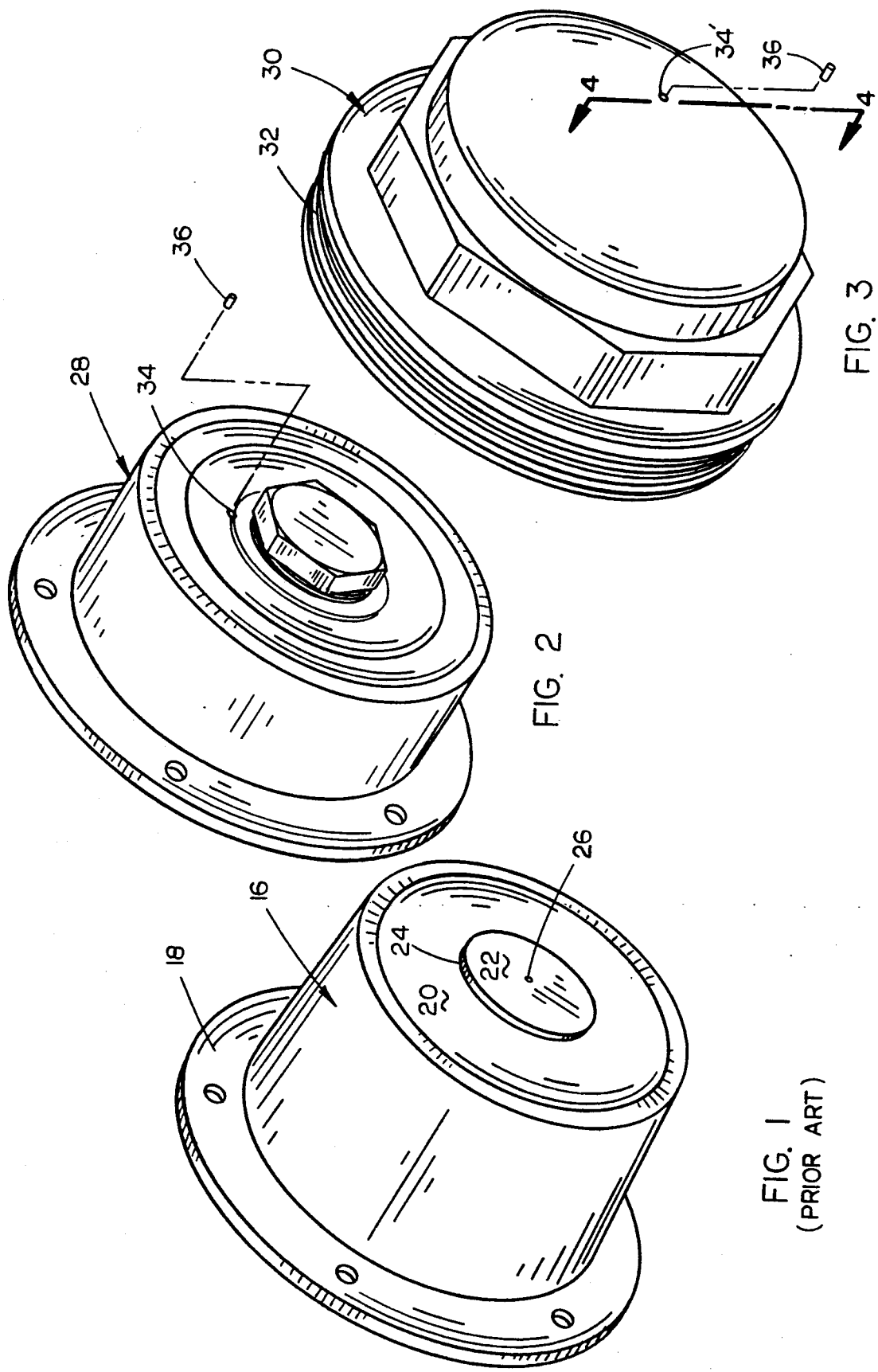

HUBCAP WITH VENT

BACKGROUND OF THE INVENTION

This invention relates to a hubcap and more particularly to a hubcap for use with automatic bearing lubrication systems.

Hubcaps are used on wheels of many trucks and trailers to prevent contaminants from entering the wheel bearings and for maintaining the oil or grease in the bearings. In recent years, Dual Dynamics, Inc. of Lincoln, Nebr. has designed a hubcap having an automatic bearing lubrication system. The hubcap of Dual Dynamics, Inc. is known as a Dual-Guard TM hubcap and includes a hubcap which may be mounted on the studs of the truck or trailer wheel or threaded onto some types of axles. The interior of the Dual-Guard TM hubcap is filled with oil or grease so that the wheel bearings are lubricated. Heretofore, it has been necessary to provide a small vent opening in the Dual-Guard TM hubcap to permit the venting of excessive pressure within the hubcap as the bearings become heated. Although the vent openings work extremely well, they do pose a problem in certain situations. For example, in some dock loading situations, the wheels of the truck move downwardly into an excavated area adjacent the dock so that the bed of the truck will be level with the dock. In some cases, the excavated area adjacent the dock may be filled with water. Should the hubcaps of the truck wheels be submerged in the water, water and other contaminants may enter the interior of the hubcap through the vent opening. The water and contaminants may dramatically shorten the life of the wheel bearings, hub and axle of the truck.

It is therefore a principal object of the invention to provide an improved hubcap.

A further object of the invention is to provide a hubcap having a vent opening formed therein which is filled with a cylindrical plug which permits air to pass therethrough to vent the hubcap but which prevents water and other contaminants from passing therethrough.

These and other objects will be apparent to those skilled in the art.

SUMMARY OF THE INVENTION

A hubcap is provided for a truck or trailer and which is designed to contain oil or the like therein so that the bearings of the associated wheel are lubricated. In the hubcap of this invention, a small vent opening is provided which is filled with a cylindrical plug which permits air to pass therethrough but which prevents water and other contaminants from passing therethrough.

BRIEF DESCRIPTION OF THE DRAWINGS

FIG. 1 is a perspective view of a hubcap of the prior art;

FIG. 2 is a perspective view of one embodiment of the invention;

FIG. 3 is a perspective view of a second embodiment of the invention;

DESCRIPTION OF THE PREFERRED EMBODIMENT

Figure 4:
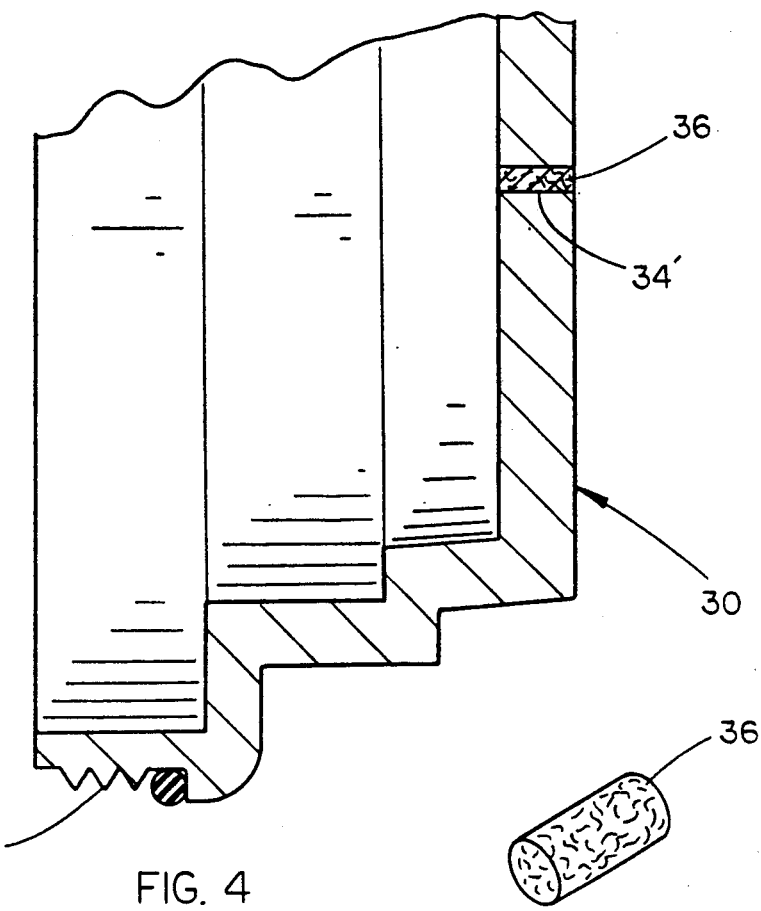
FIG. 4 is an enlarged sectional view as seen on lines 4—4 of FIG. 3.
Figure 5:
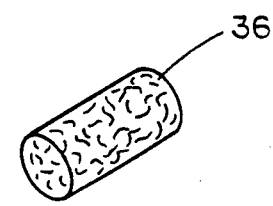
FIG. 5 is a perspective view of the plug which is inserted into the vent opening of the hubcap.
Figure 6:
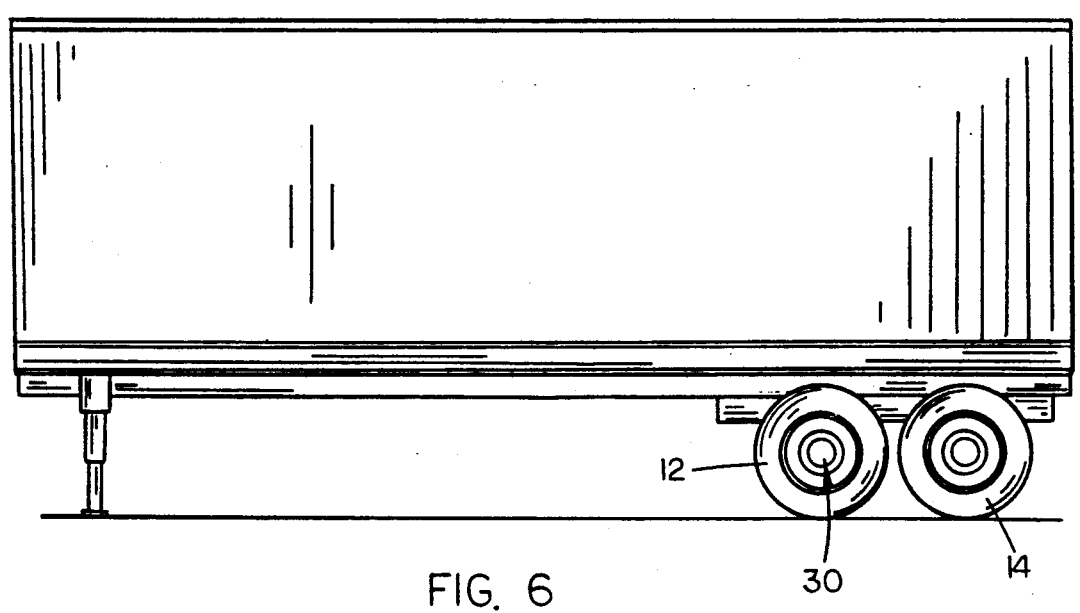
FIG. 6 is a side view of a conventional trailer.

In FIG. 6, the numeral 10 refers to a conventional trailer having wheels 12 and 14 at one side thereof. The wheels 12 and 14 include the conventional hubs, wheel bearings and axles. The hubcap of this invention is secured to each of the wheels as desired and is designed to replace the hubcap 16 of the prior art. Hubcap 16 includes a mounting flange 18 for stud mounting on the wheel. The hubcap 16 may also be of a threaded version to enable the same to be secured to Fruehauf Pro-Par TM axles. Hubcap 16 includes a sight glass 20 at the outer end thereof and a rubber plug 22 which is removably mounted in an opening 24 in the sight glass. Plug 22 may be removed from the sight glass 22 to permit oil cartridges or the like to be inserted into the interior of the hubcap 16 so that the wheel bearings, hub and axle of the wheel may be lubricated. Plug 22 includes a small vent opening 26 provided therein to permit excessive pressure to be vented from the interior of the hubcap as the wheel bearings, lubricant, etc. become heated. If vent opening 26 is not provided, the pressure buildup in the hubcap 16 could cause the wheel bearings and seals to become damaged. It is the hubcap 16 of FIG. 1 that applicant seeks to improve upon and as will now be described.

In FIG. 2, the numeral 28 refers to the hubcap of this invention while FIG. 3 illustrates a modified form of the invention and which is referred to by the reference numeral 30. As seen in FIG. 2, hubcap 28 is of the flange mounting style so that it may be mounted on the studs of the associated wheel. Hubcap 30 includes threads 32 to enable the same to be screwed on to a Fruehauf Pro-Par TM axle. Hubcap 28 is provided with a small vent opening 34 as seen in FIG. 2. Hubcap 32 is also provided with a small vent opening 34'. A cylindrical plug 36 is press fit into each of the vent openings 34 and 34'.

Plug 36 is preferably comprised of a bronze powder material cast into the cylindrical plug form. One type of bronze powder material that will function properly in this environment is manufactured by Avenger Metals North, Inc. and which is generally referred to as a 90 P spherical bronze material. The bronze material of plug 36 is impervious to water and other contaminants so that the water and contaminants will not enter the interior of the hubcap. However, the bronze construction of the plug 36 permits air to pass therethrough so that excessive pressure may be vented from the interior of the hubcap as the bearings, axle, hub, etc. become heated.

Thus it can be seen that a novel means has been provided for venting the interior of a hubcap to prevent damage to the wheel bearings and seals and which prevents the entry of contaminants and water into the interior of the hubcap. It can therefore be seen that the hubcap accomplishes at least all of the stated objectives.

I claim:

1. A hubcap for a wheel comprising,
    a generally cup-shaped member adapted to be secured to a wheel to prevent contaminants from entering the wheel bearings of the wheel,
    said cup-shaped member having a vent opening formed therein,
    and a plug means comprised of a bronze powder material cast into a cylindrical shape and press-fitted into said vent opening which permits the continuous passage of air therethrough to vent the wheel bearings but which prevents the passage of water and other contaminants therethrough.

2. The hubcap of claim 1 wherein said plug means is comprised of a spherical bronze material.

* * * * *